Dec. 1, 1959      T. FITZPATRICK      2,914,856
INDICATOR FOR MACHINE TOOLS

Filed May 25, 1953      2 Sheets-Sheet 1

INVENTOR.
Thomas Fitzpatrick
BY
D. Emmett Thompson
ATTORNEY

Dec. 1, 1959 T. FITZPATRICK 2,914,856
INDICATOR FOR MACHINE TOOLS
Filed May 25, 1953 2 Sheets-Sheet 2
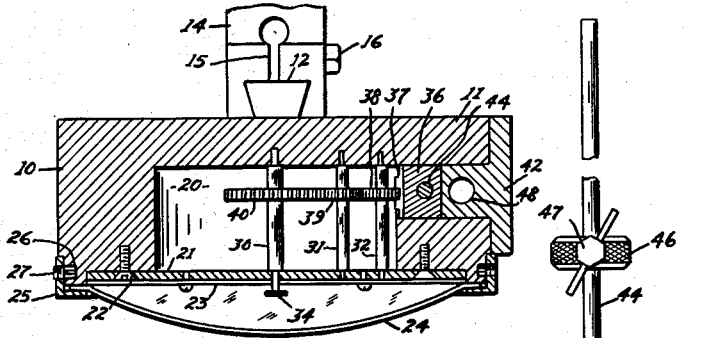
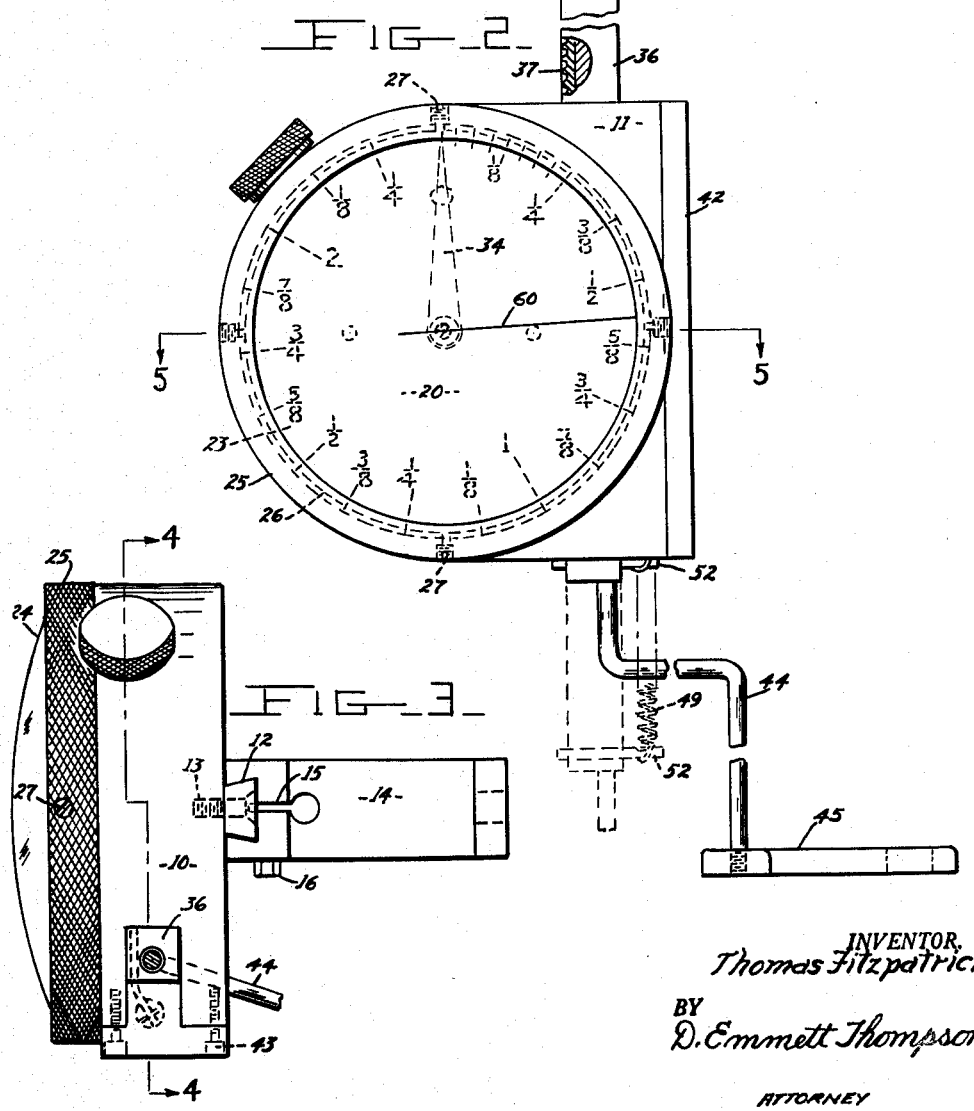
INVENTOR.
Thomas Fitzpatrick
BY
D. Emmett Thompson
ATTORNEY

2,914,856
INDICATOR FOR MACHINE TOOLS

Thomas Fitzpatrick, Syracuse, N.Y.

Application May 25, 1953, Serial No. 357,170

2 Claims. (Cl. 33—125)

This invention relates to apparatus for indicating the extent of movement of a tool carrier of a machine tool, the invention in its disclosed embodiment being specifically arranged for indicating the movement of the quill of a drill press, whereby the operator can determine the depth of the hole being drilled.

The invention has as an object an apparatus of the type referred to embodying a structural arrangement by which it can be quickly and conveniently mounted upon the machine tool, the arrangement being such that the apparatus becomes a permanent part of the machine tool without in any way interfering with its normal operation, and embodying means whereby it can be quickly and conveniently made operable and simultaneously adjusted for use.

The invention consists in the novel features and in the combinations and constructions hereinafter set forth and claimed.

In describing this invention, reference is had to the accompanying drawings in which like characters designate corresponding parts in all the views.

Figure 2 is a front elevational view of the apparatus.

Figure 3 is a side elevational view looking to the right, Figure 2.

Figure 5 is a sectional view taken on line 5—5, Figure 2.

Figure 1:
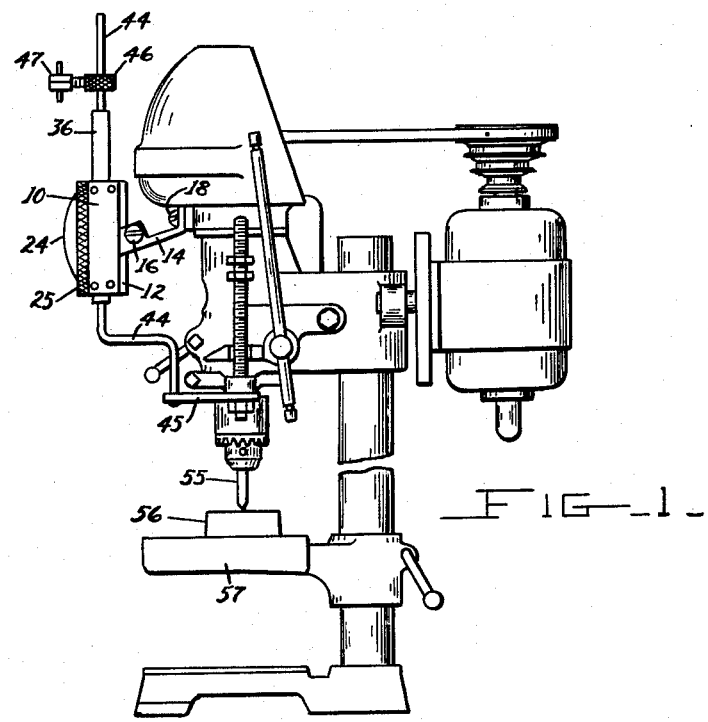
Figure 1 is a side elevational view of a drill press with a depth indicating apparatus embodying my invention mounted thereon.

The apparatus consists of a housing 10 fixedly secured to the machine tool. As here shown, the housing 10 is substantially of cylindrical formation having a vertically extending side portion 11. The housing has affixed to its rear side a bar 12, as by screws 13, the sides of the bar converging to form a dove-tail arrangement slidably received in the outer end of a bracket 14 which is provided with a complemental dove-tail formation and having a slot 15. The bar 12 extends vertically and diametrically of the housing 10 and is adjustable vertically in the outer end of the bracket 14, and is clamped in adjusted position by a screw 16, see Figures 1 and 3. The bracket 14 is fixedly secured to the frame of the machine tool, as by a screw 18.

The forward or face side of the housing is formed with a circular recess 20 and with rectangular recesses at diametrically opposite sides in the marginal portion of the recess 20. A plate 21 is positioned in these latter recesses and extends diametrically across the circular recess 20, the plate 21 being affixed to the body 10, as by screws 22. A graduated dial 23 is affixed to the plate 21, and an outer crystal 24 is fixedly secured to a ring member 25. The circular face portion of the body is formed with a circumferential groove 26, and the ring member is provided with a plurality of screws 27, the inner ends of which are positioned in the groove 26, whereby the ring member and the crystal carried thereby are rotatably mounted on the body.

A plurality of shafts 30, 31, 32, are arranged in the recess 20 and are journalled at their inner ends in the body 10 and at their outer ends in the supporting plate 21, see Figure 5. The shaft 30 extends outwardly through the plate 21 and the dial 23, and has affixed to its outer end a hand or indicator 34 movable over the graduated path on the dial. The shaft 30 is rotated by motion transmitting mechanism connected to the tool carrier of the machine tool.

In the embodiment shown, the vertically extending portion 11 of the housing is formed with a slot rectangular in cross section and extending inwardly and communicating with the circular recess 20. An actuating member 36 is slidably mounted in the inner portion of this slot and has affixed to its inner surface a gear rack 37 arranged in mesh with a gear 38 mounted on the shaft 32 and which engages a gear 39 mounted on the shaft 31, the latter gear being arranged in mesh with a gear 40 fixed to the shaft 30. Accordingly, upon vertical movement of the actuating member 36, rotation is imparted to the shaft 30.

The actuating member 36 is retained in the slot of the body by a member 42 substantially T shaped in cross section, with the head portion of the structure abutting against the edge of the vertical portion 11 and being affixed thereto as by screws 43.

The actuating member 36 is provided with a vertical bore in which there is mounted for free sliding movement a rod 44. The lower portion of the rod 44 is attached to the tool carrier of the machine. As here shown, the lower portion of the rod 44 is bent in lateral offset arrangement for attachment to a bar 45 affixed to the quill of the drill press. With this arrangement, vertical movement of the drill press quill effects vertical sliding movement of the rod 44 in the actuator 36. The rod is provided with a collar 46 having a set screw 47, permitting the collar to be clamped to the rod with the collar positioned in abutting relation to the upper end of the actuator 36. With the collar 46 fixed to the rod 44, downward movement of the quill effects downward movement of the actuator 36, causing clockwise rotation of the hand or indicator 34. The dial is graduated to indicate in fractions of an inch the downward movement of the tool carrier.

Figure 4:
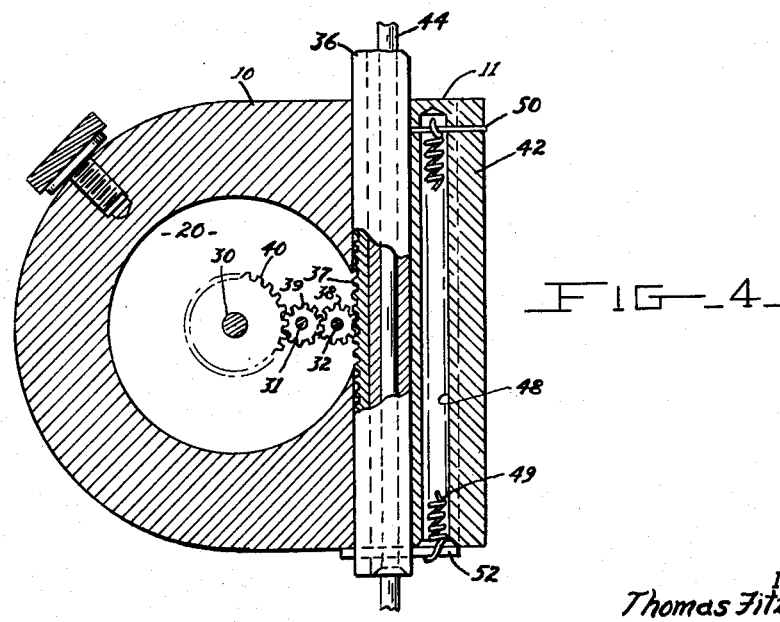
Figure 4 is a sectional view taken on line 4—4, Figure 3.

The member 42 is formed with a vertically extending bore 48 in which is mounted a tension spring 49. The upper end of the spring is affixed to the member 42 by a pin 50. The actuator 36 is provided with a laterally extending pin 52 to which the lower end of the spring 49 is attached. The spring 49 serves to yieldingly maintain the actuator 36 in its up position, as shown in Figure 4, and the hand 34 at the zero line, Figure 2.

In use, the tool carrier or drill press quill is lowered to position the end of the drill 55 in engagement with the work piece 56 positioned on the supporting table 57. The collar 46 is then moved into engagement with the upper end of the actuator 36 and the screw 47 tightened. Movement of the drill press quill downwardly during the boring operation will thereupon effect rotation of the indicator 34, indicating the depth of the hole being bored.

It will be observed that if it is not desired to use the depth indicator, it is only necessary to leave the set screw 47 loosened, which permits the rod 44 to slide freely up and down in the actuator 36. When it is desired to use the indicator, it is only necessary to tighten the screw 47. As an aid in boring several holes the same depth in like work pieces, the crystal 24 may be provided with a depth line 60, the crystal and ring 25 being rotated to bring the line to the desired position and thereafter, it is only necessary for the operator to operate the drill until the hand 34 coincides with the depth line 60.

What I claim is:

1. Apparatus for indicating the extent of movement of a tool carrier of a machine toward a work piece comprising a housing fixedly secured to the machine, an indicating element mounted in said housing and being movable over a graduated path on the housing, an actuating member slidably mounted in the housing for movement in a direction parallel with the movement of the tool carrier, said actuating member being formed with an aperture extending therethrough in a direction parallel to the movement of said member, a rod secured to the tool carrier and having a portion mounted in said aperture for free sliding movement therein and extending through said actuating member, means yieldingly urging said actuating member in one direction, a collar mounted on the rod for adjustment lengthwise thereof, and means for clamping the collar to the rod for engagement with one end of said actuating member to effect movement thereof in the opposite direction upon tool feeding movement of the tool carrier, and motion transmitting means operatively connecting said actuating member and said indicating element to effect movement thereof over said path upon movement of said actuating member in said opposite direction by said rod and collar.

2. Apparatus for indicating the extent of feeding movement of a tool carrier of a machine toward a work piece comprising a housing fixedly secured to the machine, an indicating element mounted in the housing for movement over a graduated path, a gear rack mounted in the housing for sliding movement in a direction parallel with the movement of the tool carrier, gearing mounted in the housing and connecting said gear rack with said indicating element to cause the same to move over said path upon reciprocation of the gear rack in said housing, spring means operable to urge said gear rack in a direction opposite to the tool feeding movement of the tool carrier, said gear rack being provided with an aperture extending lengthwise therethrough, a rod fixedly connected to the tool carrier and having a portion mounted in said aperture in said gear rack for free sliding movement therein and said rod extending through said gear rack, a collar carried by the rod for engaging one end of said rack member for effecting movement thereof against the action of said spring upon tool feeding movement of the tool carrier, and means for adjustably securing said collar to the rod.

References Cited in the file of this patent

UNITED STATES PATENTS

| | | |
|---|---|---|
| 1,323,267 | Hanson | Dec. 2, 1919 |
| 1,679,501 | Scusa | Aug. 7, 1928 |
| 2,527,173 | Boat | Oct. 24, 1950 |

FOREIGN PATENTS

| | | |
|---|---|---|
| 837,232 | France | Nov. 3, 1938 |
| 815,702 | Germany | Oct. 4, 1951 |